(12) United States Patent
Wu

(10) Patent No.: US 7,413,151 B2
(45) Date of Patent: Aug. 19, 2008

(54) RECONFIGURABLE HOLDING DEVICE

(75) Inventor: Chieh-Feng Wu, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 191 days.

(21) Appl. No.: 11/356,989

(22) Filed: Feb. 21, 2006

(65) Prior Publication Data

US 2007/0194194 A1   Aug. 23, 2007

(51) Int. Cl.
*F16M 11/38* (2006.01)
(52) U.S. Cl. .................. 248/166; 248/231.51; 248/918; 348/373
(58) Field of Classification Search ............ 248/231.51, 248/166, 309.1, 687–689; 348/373, 375; 396/579, 478; 361/679; D16/202
See application file for complete search history.

(56) References Cited

U.S. PATENT DOCUMENTS

| 5,109,411 | A * | 4/1992 | O'Connell ................... 379/454 |
| 6,315,180 | B1 * | 11/2001 | Watkins ...................... 224/275 |
| 6,418,010 | B1 | 7/2002 | Sawyer |
| 6,738,094 | B1 * | 5/2004 | Minami et al. .............. 348/373 |
| 6,947,093 | B2 * | 9/2005 | Yanakawa et al. ........... 348/373 |
| 2004/0012674 | A1 * | 1/2004 | Wada .......................... 348/169 |
| 2007/0001071 | A1 * | 1/2007 | Yeh .......................... 248/179.1 |

* cited by examiner

*Primary Examiner*—Korie H. Chan
(74) *Attorney, Agent, or Firm*—Rosenberg, Klein & Lee

(57) ABSTRACT

The present invention relates to a reconfigurable holding device comprising a first plate, a second plate and a joint piece. The first plate includes a first arm and a second arm to rest an electronic device on the first arm. The second plate includes a third arm and a fourth arm. The joint piece can be a hinge wherein one end of the hinge is fixed to the first arm and the other end is fixed to the third arm so that the first plate and the second plate can be held at a post-pivot angle.

24 Claims, 5 Drawing Sheets

RECONFIGURABLE HOLDING DEVICE

FIELD OF THE INVENTION

The present invention relates to a stand of holding device for mounting an electronic device (for example, a camera) and, more particularly, to one that can assume both a lying disposition and a hanging disposition, to be hung on electronic machines with various thicknesses.

BACKGROUND OF THE INVENTION

The U.S. Pat. No. 6,845,954B1 [Kinematically Reconfigurable Camera Mount] discloses the support member is configured to either rest the bottom support surface on a generally horizontal surface of an object on which to place the camera supporting device or to engage the lower inwardly arched surface with a vertical front surface and a horizontal top surface forming an edge of an object on which to place the camera supporting device. However, with the flexible legs, the U.S. Pat. No. 6,845,954B1 can only achieve small curvature, thus, noticeably; the supporting device hangs loose on an electronic machine with thick, or even thin, front and rear walls.

In view of the shortcomings of said known device, the inventor of the present invention studied hard and devised an improved lying/hanging holding device intended to be hung on electronic machines with different thickness.

SUMMARY OF THE INVENTION

Accordingly, an object of the present invention is to provide a reconfigurable holding device for holding an electronic device when it assumes a lying disposition or a hanging disposition and thereby be hung on electronic machines with various thicknesses.

To achieve the above objects, the present invention provides a reconfigurable holding device comprising a first plate which includes a first arm and a second arm oriented at a right angle to each other and holds an electronic device with the first arm, a second plate which includes a third arm and a fourth arm oriented at a right angle to each other, and a joint piece which connects the first plate and the second plate and enables them to hang loose at a post-pivot angle.

For a further understanding of the nature and advance of the invention, reference should be made to the following description in conjunction with the accompany drawings.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE INVENTION

Figure 1:
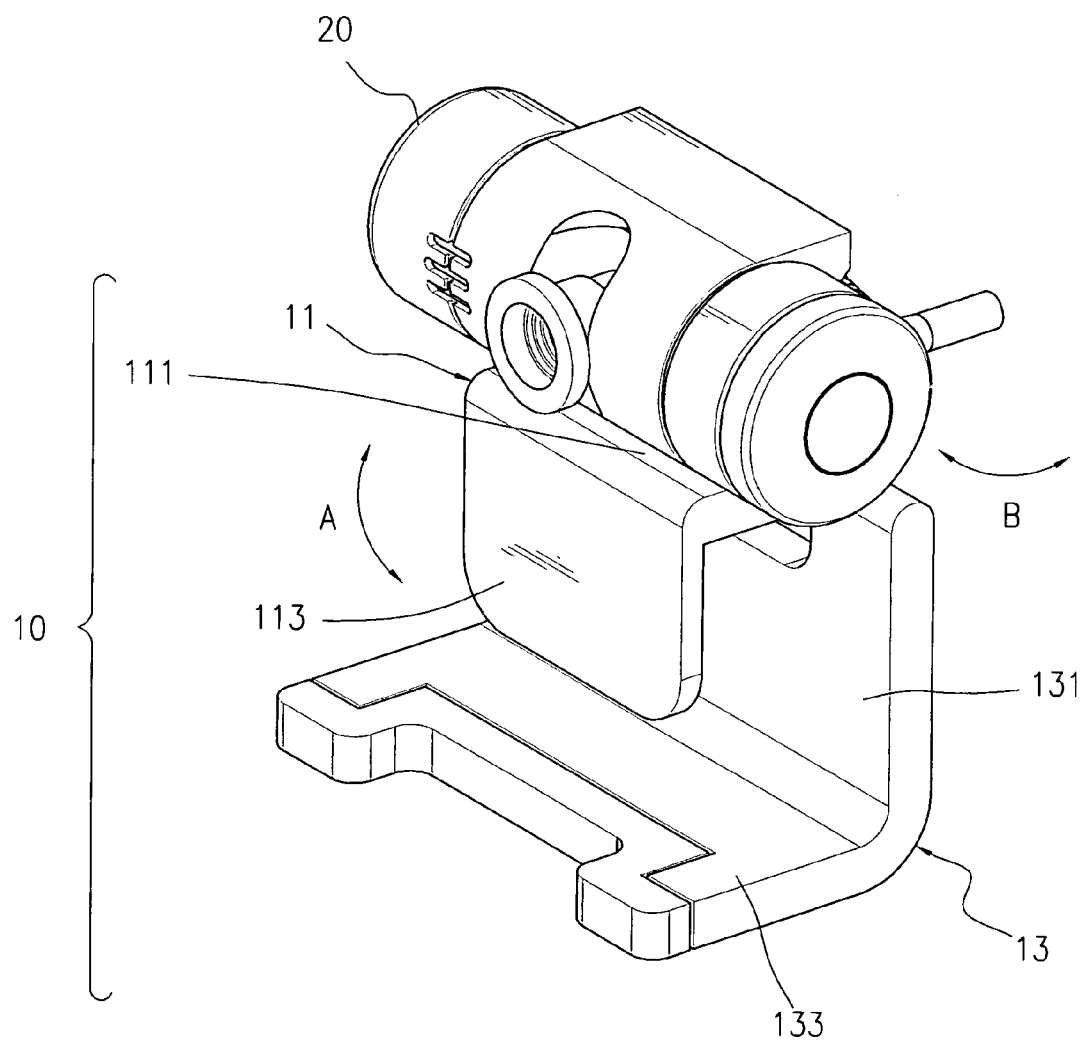
FIG. 1 is a diagram showing the exploded view of a reconfigurable holding device according to the exemplary embodiment of the present invention.
Figure 2:
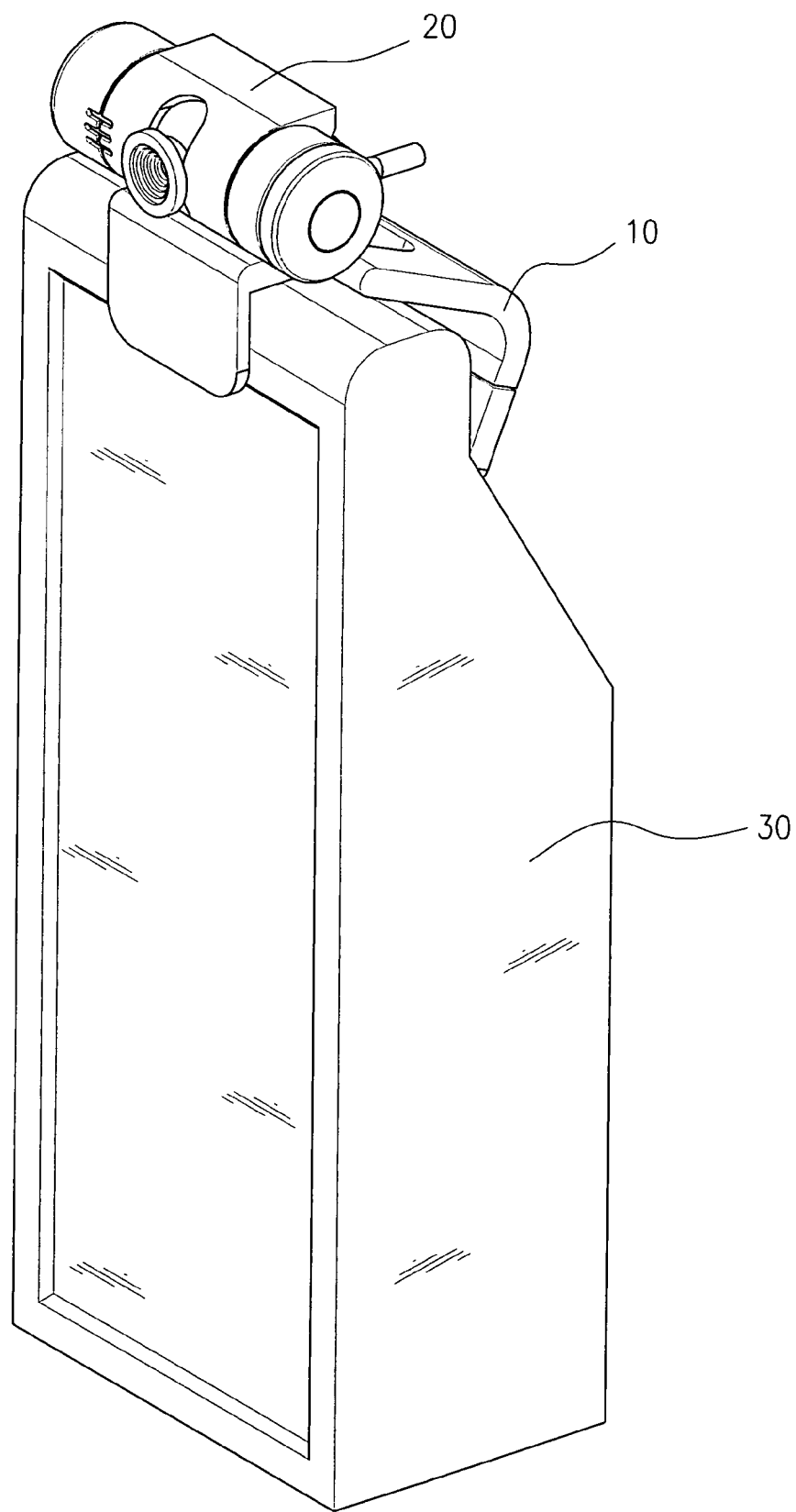
FIG. 2 is a diagram illustrating a clamp operation of an exemplary embodiment of the present invention.

FIG. 1 is the preferred embodiment of a reconfigurable holding device in accordance with the present invention. A holding device 10 of the present invention comprises a first plate 11 and a second plate 13, with one end of the first plate 11 and that of the second plate 13 being kinematically coupled to each other, the first plate 11 is rotated in the direction A so that an included angle between the first plate 11 and the second plate 13 can be varied at will and they can be held at a changed included angle. FIG. 2 is a diagram showing how to clamp the reconfigurable holding device to an electronic machine in accordance with the present invention; in addition to a lying disposition, the holding device 10 of the present invention can be firmly clamped to electronic machines 30 with various thickness after the first plate 11 and the second plate 13 were rotated to form various included angles and held at a selected included angle.

Figure 3:
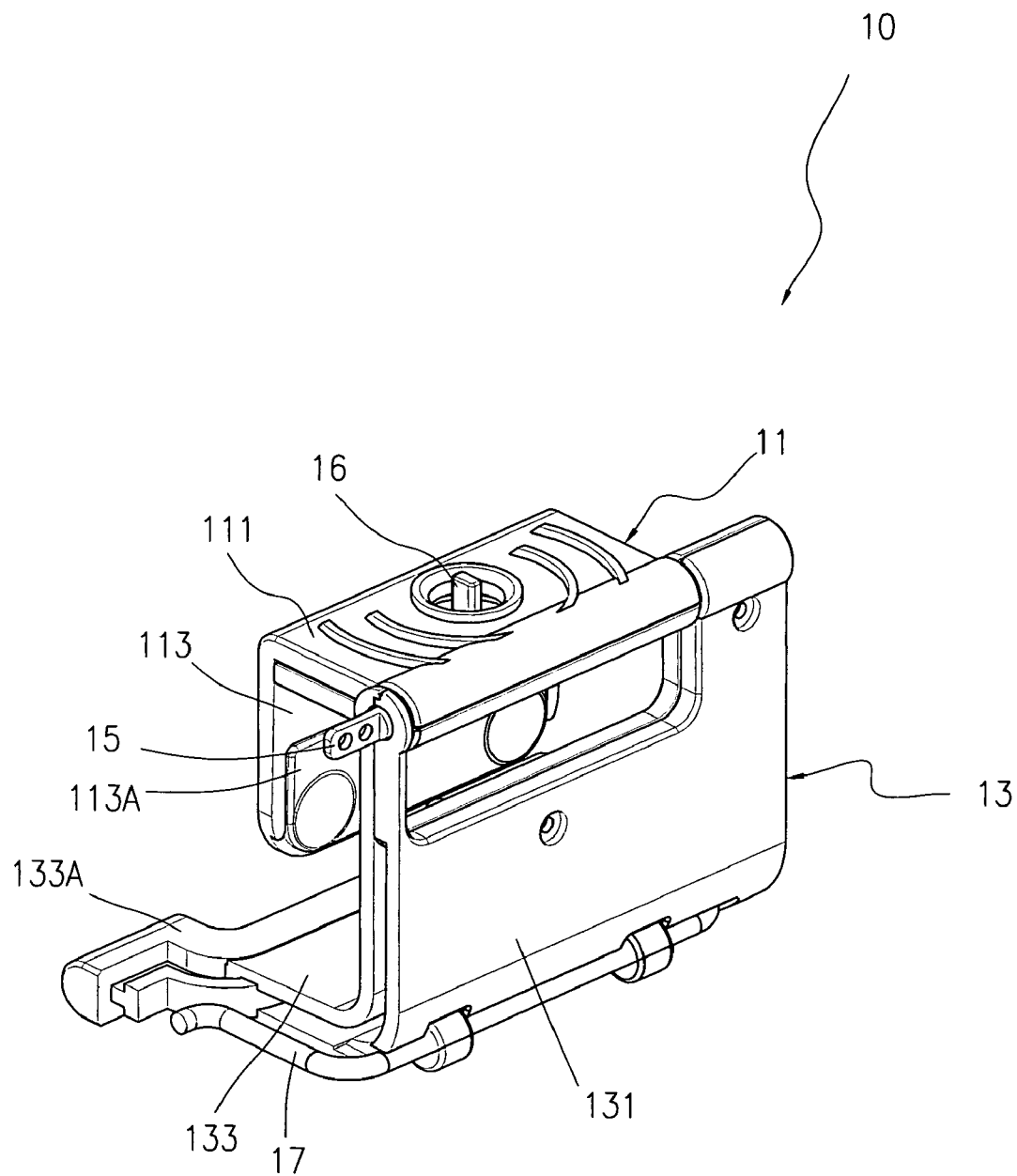
FIG. 3 is a diagram illustrating the back exploded view of the holding device of the present invention.
Figure 4:
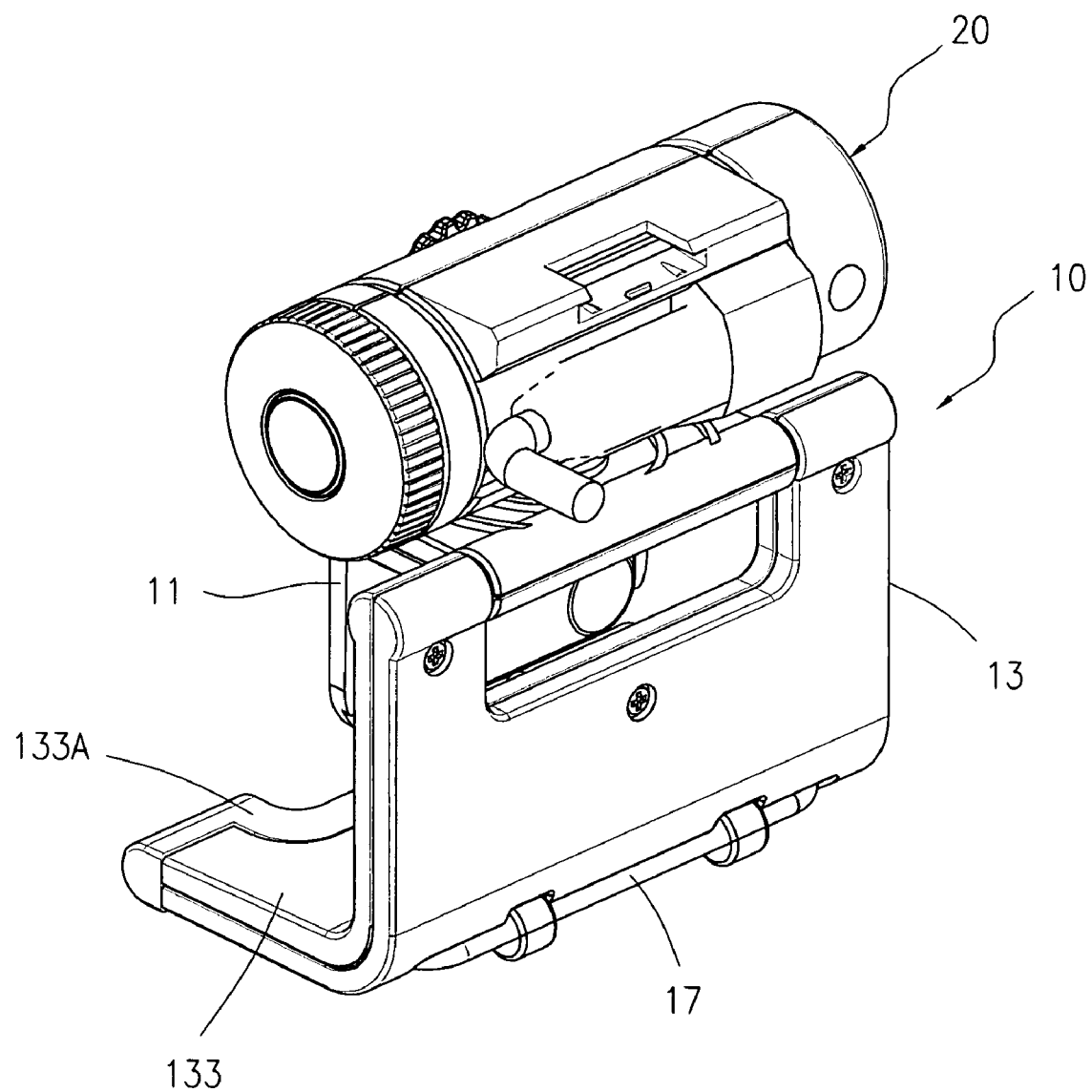
FIG. 4 is a diagram illustrating the back exploded view of exemplary embodiment shown in FIG. 3.

FIG. 3 is the back view of the holding device of the present invention, and FIG. 4 is the back view of the embodiment for resting an electronic device on the holding device of FIG. 3 in accordance with the present invention. The first plate 11 includes a first arm 111 and a second arm 113 oriented at a right angle to each other, and the first arm 111 is intended to hold an electronic device 20; real examples of the electronic device 20 are, namely a video camera, digital camera, image pick-up device, and voice pick-up device. The second plate 13 includes a third arm 131 and a fourth arm 133 oriented at a right angle to each other. A joint piece 15 connects the first plate 11 and the second plate 13 and enables them to move and then be held at a post-pivot angle; a hinge serves as a means to the embodiment of the joint piece 15. One end of the hinge 15 is fixed to the first arm 111, whereas its other end is fixed to the third arm 131; given the pivot provided by the hinge 15 and a post-pivot holding function, an included angle between the first plate 11 and the second plate 13 can be varied at will and they can be held at a changed included angle.

Figure 5:
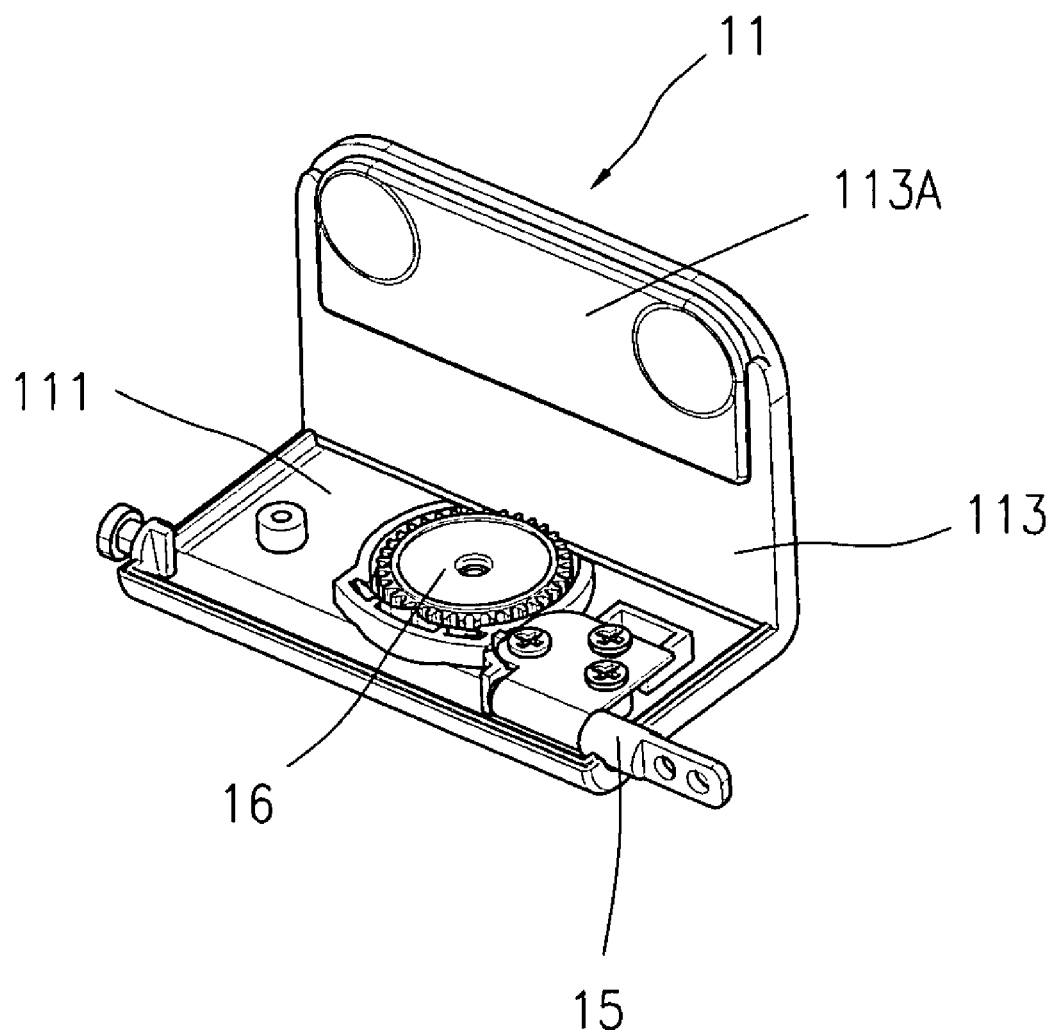
FIG. 5 is a diagram illustrating the gear installed in the first plate of the present invention.

FIG. 5 illustrates the embodiment of a gear installed in the first plate of the present invention. According to the present invention, the electronic device 20 installed on the first plate 11 is designed to be rotation-style so that the electronic device 20 can be manipulated to facilitate the smooth selection of an intended position, for instance, a camera lens may smoothly select a shooting position. The holding device 10 of the present invention further comprises the gear 16 installed on the first arm 111; one end of the gear 16 is connected to the electronic device 20; the electronic device 20 rotates as a result of the rotation of the gear 16 in the circumferential direction B, as shown in FIG. 1.

The holding device 10 of the present invention further comprises an anti-slip pad 113A and a anti-slip pad 133A installed on the second arm 113 and the fourth arm 133 respectively, to further achieve the stable flat-lying or clamping effect of the holding device 10 and prevent the electronic machine 30 from wear and tear arising out of contact friction. The anti-slip pads 113A and 133A may be made from soft rubber.

In addition, to further enhance the stable flat-lying effect of the holding device 10, the holding device 10 of the present invention further comprises an auxiliary bracket 17 installed on the fourth arm 133, and the auxiliary bracket 17 may be pulled out of the fourth arm 133 to enhance the stable flat-lying effect.

The first plate 11 and the second plate 13 of the present invention are not limited to be L-shaped; instead, whatever two-dimensional plates or frames can be embodiments of the first plate 11 and the second plate 13, provided that including the characteristics of the first plate 11 and the second plate 13.

The first plate 11 and the second plate 13 may be made from hard plastic or metallic plates.

Various embodiments and changes may be made thereunto without departing from the broad spirit and scope of the invention. The above-described embodiment is intended to illustrate the present invention, not to limit the scope of the present invention.

The scope of the present invention is shown by the attached claims rather than the embodiment. Various modifications made within the meaning of an equivalent of the claims of the invention and within the claims are to be regarded to be in the scope of the present invention.

What is claimed is:

1. A reconfigurable holding structure, comprising: a first plate including a first arm and a second arm not lying in the same plane; and a second plate including a third arm and a fourth arm not lying in the same plane, wherein said third arm is pivotally connected to said first arm, said third arm and said first arm are held at a post-pivot angle; and
   an auxiliary bracket movably disposed on said fourth arm, said auxiliary bracket being extendable to provide stability;
   whereby an electronic device is held by said first arm.

2. The holding structure of claim 1, wherein said first plate is L-shaped.

3. The holding structure of claim 1, wherein said second plate is L-shaped.

4. The holding structure of claim 1, further comprising a hinge with one end fixed to said first arm and the other end fixed to said third arm.

5. The holding structure of claim 1, further comprising a gear installed on said first arm and connected to said electronic device, wherein said gear is used for rotating in a circumferential direction to rotate said electronic device.

6. The holding structure of claim 1, further comprising an anti-slip pad installed on said fourth arm.

7. The holding structure of claim 1, further comprising an anti-slip pad installed on said second arm.

8. The holding structure of claim 1, wherein said auxiliary bracket is pullably installed on said fourth arm to enhance a stable disposition effect.

9. The holding structure of claim 1, wherein said electronic device is a member selected from the group consisting of a video camera, digital camera, image pick-up device, and voice pick-up device.

10. A reconfigurable holding structure, comprising:
    a first plate including a first arm and a second arm; a second plate including a third arm and a fourth arm oriented at a right angle to each other; and a joint piece connecting said first plate and said second plate and enabling said first plate and said second plate to be rotated and held at a post-pivot angle wherein said joint piece is a hinge, one end of said hinge is fixed to said first arm and other end of said hinge is fixed to said third arm, to enable said first plate and said second plate to be held at said post-pivot angle; and
    an auxiliary bracket movably disposed on said fourth arm, said auxiliary bracket being extendable to provide stability;
    whereby an electronic device is held by said first arm.

11. The holding structure of claim 10, further comprising a gear installed on said first arm and connected to said electronic device, wherein said gear is used for rotating in a circumferential direction to rotate said electronic device.

12. The holding structure of claim 10, further comprising an anti-slip pad installed on said fourth arm.

13. The holding structure of claim 10, further comprising an anti-slip pad installed on said second arm.

14. The holding structure of claim 10, wherein said auxiliary bracket is pullably installed on said fourth arm, to enhance a stable disposition effect.

15. The holding structure of claim 10, wherein said electronic device is a member selected from the group consisting of a video camera, digital camera, image pick-up device, and voice pick-up device.

16. The holding structure of claim 10, wherein said first arm and said second arm are oriented at a right angle to each other, said third arm and said fourth arm are oriented at said right angle to each other.

17. A reconfigurable holding structure, comprising:
    a first plate including a first arm and a second arm, a second plate including a third arm and a fourth arm, wherein said first plate is connected to said second plate, said first plate and said second plate can be rotated relative to each other and held at a post-pivot angle further comprising a hinge with one end fixed to said first arm and the other end fixed to said third arm; and
    an auxiliary bracket movably disposed on said fourth arm, said auxiliary bracket being extendable to provide stability;
    whereby an electronic device is held by said first arm.

18. The holding structure of claim 17, wherein said first plate is L-shaped.

19. The holding structure of claim 17, wherein said second plate is L-shaped.

20. The holding structure of claim 17, further comprising a gear installed on said first arm and connected to said electronic device, wherein said gear is used for rotating in a circumferential direction to rotate said electronic device.

21. The holding structure of claim 17, further comprising an anti-slip pad installed on said fourth arm.

22. The holding structure of claim 17, further comprising an anti-slip pad installed on said second arm.

23. The holding structure of claim 17, wherein said auxiliary bracket pullably installed on said fourth arm to enhance a stable disposition effect.

24. The holding structure of claim 17, wherein said electronic device is a member selected from the group consisting of a video camera, digital camera, image pick-up device, and voice pick-up device.

* * * * *